United States Patent [19]

Cohen et al.

[11] Patent Number: 4,591,478
[45] Date of Patent: May 27, 1986

[54] METHOD OF IDENTIFYING DEFECTIVE PARTICLE COATINGS

[75] Inventors: Mark E. Cohen; Carlton D. Whiting, both of San Diego, Calif.

[73] Assignee: The United States of America as represented by the Department of Energy, Washington, D.C.

[21] Appl. No.: 526,968

[22] Filed: Aug. 26, 1983

[51] Int. Cl.[4] .............................................. G21C 17/00
[52] U.S. Cl. ..................................... 376/253; 376/251
[58] Field of Search ............................... 376/250–253, 376/450, 451

[56] References Cited

U.S. PATENT DOCUMENTS

| | | | |
|---|---|---|---|
| 1,950,543 | 3/1934 | Dohrn | 260/42 |
| 2,846,872 | 8/1958 | McAdams et al. | 376/251 |
| 2,851,338 | 9/1958 | Johns et al. | 376/251 |
| 3,316,407 | 4/1967 | Ichikawa | 250/108 |
| 3,535,443 | 10/1970 | Rieke | 178/6.8 |
| 3,704,370 | 11/1972 | Shelton | 250/65 R |
| 4,172,224 | 10/1979 | Lapinski et al. | 250/302 |
| 4,227,081 | 10/1980 | Caputo et al. | 250/321 |
| 4,229,764 | 10/1980 | Danos | 358/160 |

*Primary Examiner*—Salvatore Cangialosi
*Attorney, Agent, or Firm*—Fitch, Even, Tabin & Flannery

[57] ABSTRACT

A method for identifying coated particles having defective coatings designed to retain therewithin a build-up of gaseous materials including:

(a) Pulling a vacuum on the particles;
(b) Backfilling the particles at atmospheric pressure with a liquid capable of wetting the exterior surface of the coated particles, said liquid being a compound which includes an element having an atomic number higher than the highest atomic number of any element in the composition which forms the exterior surface of the particle coating;
(c) Drying the particles; and
(d) Radiographing the particles.

By television monitoring, examination of the radiographs is substantially enhanced.

9 Claims, No Drawings

METHOD OF IDENTIFYING DEFECTIVE PARTICLE COATINGS

BACKGROUND OF THE INVENTION

This invention was made with Government support under contract No. DE-AT03-76ET35300 awarded by the Department of Energy. The Government has certain rights in this invention.

The present invention relates to a method of identifying defects and, more specifically, to a method of identifying defective permeable coatings on reactor fuel particles.

It is well known to apply coatings to globular particles of nuclear fuel, i.e., fissile and/or fertile materials, such as uranium, plutonium and thorium and suitable compounds thereof. Such coated particles are useful for formation into fuel rods employed in a high temperature gas cooled reactor (HTGR). One such particle is designated as TRISO and includes over a core of nuclear material, an inner layer of low density buffer material, a seal layer over the buffer, a shell of, for example, silicon carbide, and an outer carbon coating. Certain layers and particularly the silicon carbide shell have sufficient impermeability to retain gaseous and metallic fission products therein by serving generally as pressure vessels. The other layers of the coating accomodate expansion of the nuclear material during high temperature operation, provide a gas barrier during remaining layer application steps thereby preventing possible chemical reaction, and maintain the shell in slight compression to reinforce it. Examples of such coated fuel particles are further described and shown in U.S. Pat. Nos. 3,361,638, 3,649,452, and 3,650,896.

It is common practice to inspect particle samples at various stages of the coating process as well as to test particles with completed coatings to identify defective coating layers. One such test is known as the burn leach method. In this method, the outer carbon coating of the particles is burned away to bare the silicon carbide shell. The shell is exposed to a leaching material, e.g., wet acid, and if the shell is cracked, some of the core or kernel material will leach out. Besides requiring quantitative analysis, this method is long, cumbersome, and presents safety considerations.

A suggested improvement in the detection of cracked SiC shells is the mercury impregnation method wherein the exposed SiC shells are subjected to intrusion by pressurized mercury. After an acid washing, the particles are x-rayed. Cracked shells are able to be identified by viewing the radiographs through a microscope. The mercury impregnation method, while a considerable advancement over the burn leach method, has some shortcomings. In use, mercury becomes dirty and smears over the particles causing them to adhere to one another. The test is relatively slow because of the need to apply the mercury under pressure and the requirement for an acid washing. This test also has practical limitations as to sample size since the largest sample holder in a mercury porosimeter has a capacity of only about 10,000 particles.

Other tests, involving the use of chlorine gas, have been suggested for determining the existence of cracks in a carbon coating. A recently proposed test for determining the existence of cracks in the outer carbon coating covering the silicon carbide shell involves subjecting the outer carbon coating to a substantially pure chlorine gas atmosphere at an elevated temperature for an extended period. Radiographing the so treated particles to determine changes in density in the silicon carbide shell indicates chemical reaction between the chlorine gas and the silicon carbide due to cracked outer carbon coatings. For further details of this method, reference may be made to U.S. Pat. No. 4,227,081.

SUMMARY OF THE INVENTION

Among the several objects of the present invention may be noted the provision of an improved and safer method for identifying the presence of nuclear particles having defective, permeable coatings; the provision of such method which can be completed relatively quickly, cleanly and reliably; the provision of such method which avoids the requirement of pressurized intrusion of the particles; the provision of such method which avoids the need for acid washing, and the provision of such method which is simple and economical to carry out. Other objects and features of the method of the present invention will be in part apparent and in part pointed out in the following specification and attendant claims.

Briefly, the method of testing for defective coatings includes contacting the particles with a liquid capable of wetting the exterior coating surface of the particles and having an element with an atomic number higher than the atomic number of an element in the particle coating, drying the particles and radiographing the particles.

DESCRIPTION OF THE PREFERRED EMBODIMENT

The present invention involves a new method for determining the existence of defective coatings in coated nuclear fuel particles. This method is a significant improvement over the mercury impregnation method in the determination of defective SiC coatings in TRISO HTGR fuel particles. The method of the present invention also has application in the detection of porous pyrocarbon coatings. More specifically, it can be employed at the buffer-inner pyrocarbon stage in TRISO HTGR fuel particles or at the buffer-pyrocarbon stage in BISO HTGR fuel particles. In the preferred embodiment, the method comprises the steps of:

1. Pulling vacuum on the particles with the coating to be tested for defects exposed.
2. Backfilling the particles at atmospheric pressure with a liquid capable of wetting the exterior surface of the particles with the liquid being a compound which includes an element having an atomic number higher than the atomic number of any element in the composition which forms the surface of the particle coating.
3. Drying the particles.
4. Radiographing the particles.

More specifically, the liquid preferably contains iodine or has an element with an atomic number of 53 (iodine) or above. Any liquid having an element of sufficiently high atomic number relative to the atomic number of the elements in the particle coating (silicon in the silicon carbide coating, carbon in the pyrocarbon coating) will have the desired effect of showing a defective coating when radiographed. This occurs because the liquid having the element with the higher atomic number, upon reception in the crack or porosity, effectively masks the element in the coating having the lower atomic number thereby offering sufficient contrast in the x-ray to enable identification of flawed coatings. A preferred liquid is methylene iodide because it is commonly available and easy to use. It also has a sufficiently high boiling point, and a sufficiently low surface tension and molecular weight. More generally, the liquid for wetting the particle coating can be an organic compound that will be liquid at the pressure and temperature of use and which has one or more halogen moieties selected from the group consisting of chlorine, bromine and iodine, for example, ethyl chloride, ethyl iodide, allyl bromide, allyl chloride, butyl bromide, butyl chloride, butyl iodide, propyl bromide, propyl chloride and propylene chloride. Preferably the organic compound has a molecular weight of not more than about 500 and preferably not more than about 300. The compound preferably has a surface tension, at 20° C., of less than about 50 dynes per square centimeter and more preferably less than 25 dynes per square centimeter.

One particular application of this method is the identification of the quantity of TRISO fuel particles having defective permeable silicon carbide shells in a group of such coated particles, most of which have satisfactory relatively non-permeable SiC shells. After burning back the outer carbon coating to expose the SiC pressure vessel, a vacuum is pulled on particles in a suitable container and the container is then backfilled with methylene iodide at atmospheric pressure. If there is excessive methylene iodide, the excess can be conveniently removed by washing the particles with a solvent such as acetone. After drying, the particles are radiographed and defects observed. A group of particles so treated were subjected to a pressure of 10,000 psi and they did not have significantly more defective SiC shells than at atmospheric pressure, thus demonstrating the validity of the method of the present invention when carried out at atmospheric pressure, unlike the mercury impregnation method which requires pressurized intrusion of the mercury because mercury does not wet the particles at atmospheric pressure.

Besides testing the SiC coating after completion of the application of all particle coatings, the SiC coating can be tested after the SiC application stage of the coating process. There may be an advantage, however, in testing the completed particle. In defective particles having cracked SiC layers, the removal of the outer carbon coating by burning may affect, through the crack, material from a layer inside the SiC shell. This may have such an effect upon the crack so as to amplify penetration of the contrast liquid to further enhance the contrast in the x-ray.

The method of the present invention can be used to check for defective SiC layers from the time of application of the SiC layer until and through completion of manufacture of a fuel rod. It may be desirable to perform the test at multiple stages because the application of heat or pressure in subsequent operations after application of a satisfactory SiC layer might result in cracking of the SiC layer. Fuel rods are formed by metering predetermined quantities of fissile and fertile particles; blending them; and injection molding them using a matrix material which could be a pitch formed by a mixture of petroleum and very fine graphite flour. Of course, the injection molding takes place under carefully controlled conditions of high temperatures and pressure. The product ejected from the molding machine is known as a "green" rod. Green rods can be tested for particles with broken SiC layers by dissolving away the matrix material, removing the coated particles from the much finer graphite flour, burning off the outer carbon coating, and contacting the now exposed SiC layer with the contrast liquid.

In order to bring the green rods to the completed or "fired" stage in which they are ready for use in nuclear reactors, the green rods are subjected to very high temperature in an inert atmosphere causing the petroleum in the pitch to carbonize. Fuel rods in the fired stage can also be tested for particles with broken SiC layers. by decomposing the rods electrolytically or by burning. It may be desirable to test the particles for cracked SiC layers at various stages to insure compliance with stringent government requirements that the extent of defective particles does not exceed one in 10,000 particles with 95 percent reliance, and to correct any problems as early as possible. It should be noted that the method of the present invention is not limited to use in checking cracked SiC layers in fuel particles. It can be used, for example, in testing for cracked SiC coatings on lithium kernels, which coatings are used as pressure vessels to retain tritium gas generated from the lithium.

Besides testing for cracked SiC layers, the method of the present invention is also useful for identifying porous inner pyrolytic carbon (IPyC) layers. The IPyC layer functions to protect the kernel during application of the SiC coating and may or may not have a function in the final particle structure. If the IPyC layer is porous, the kernel may become involved in a deleterious chemical reaction during application of the SiC layer.

A group of $ThC_2$ particles having known porous IPyC coatings was taken after application of buffer and inner pyrocarbon layers, evacuated and backfilled with methylene iodide at atmospheric pressure. After washing, drying and radiographing, the resulting x-ray plates showed methylene iodide intrusion at atmospheric pressure into the inner buffer layer of a particle having a porous IPyC coating. Testing at 10,000 psi failed to show any significant difference in the number of particles having defective coatings, again demonstrating the validity of the method of the present invention when carried out at atmospheric pressure. An additional test on a group of $ThC_2$ particles having known non-porous IPyC coatings did not show intrusion by methylene iodide at the buffer-pyrocarbon layer application stage at either atmospheric pressure or at 10,000 psi.

The use of the method of the present invention for detecting porous IPyC coatings is particularly suited for routine employment in quality or process control. Depending on sample size and disregarding the time for radiographing and observation, the test can be undertaken in one-half hour. The only prior method for detecting porous IPyC coatings is the time consuming and potentially dangerous leach test.

While the examination of the resulting x-ray plates can be undertaken by observing the plates directly through a microscope, it has been found that fine particle coating defects such a hairline cracks can be more readily observed by the use of a television system. Thus the method preferably further includes the steps of:

5. Obtaining an image of the resulting radiograph by use of a television camera viewing the radiograph through a microscope.

6. Displaying the image on a television monitor.

For particularly fine defects, identification might be missed when viewing directly through the microscope whereas they can be easily found by viewing using the TV monitor. The enhancement in contrast on the TV monitor can be attributed to a lack of glare from the transmitted light source. When viewed through a microscope using the television monitor, the shading or shadow effect is increased. The result is that particle coatings having a small or fine defect could be identified using the television system while they could be missed or could be seen only with great difficulty and eye strain with direct viewing through the microscope.

The x-ray plate television examination system includes a high resolution video camera and preferably a monitor having a black and white screen. Also preferably a microcomputer-controlled microscope stage can be used for governing x-ray plate movement and inspection. It has been found that photographs can be taken of the monitor screen with insignificant loss in contrast and ability to detect the presence of fine cracks.

The method of the present invention is a considerable improvement over the burn leach and mercury impregnation methods. The present method can be carried out relatively quickly, economically, and with increased safety. There is no need for pressurized intrusion of the contrast liquid, and the need for acid washing is eliminated. Unlike mercury, methylene iodide does not become dirty in use which results in smearing and particle adhesion. Also larger samples can be tested because the use of a mercury porosimeter, which has very limited capacity, is eliminated.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. A method for identifying coated nuclear fuel particles having defective retentive coatings in a group of such particles, said method comprising the following steps:

contacting the particles with a liquid organic iodide capable of wetting the exterior layer surface of said coated particles, said liquid iodide being a compound which includes an element having an atomic number higher than the highest atomic number of any element in the composition which forms said exterior surface of. said particle coating;

drying the particles; and radiographing said dried particles.

2. A method as set forth in claim 1 wherein said liquid comprises methylene iodide.

3. A method as set forth in claim 1 wherein said exterior layer surface is formed of carbon.

4. A method as set forth in claim 3 wherein said exterior layer surface includes silicon carbide.

5. A method as set forth in claim 4 wherein said exterior layer includes pyrocarbon.

6. A method as set forth in claim 1 further comprising subjecting said particles to vacuum conditions prior to said contacting step and thereafter washing said particles in a solvent prior to said drying.

7. A method as set forth in claim 6 wherein said solvent comprises acetone.

8. A method as set forth in claim 1 further comprising:

obtaining an image of the resulting radiograph by use of a television camera viewing said radiograph through a microscope; and displaying said image on a television monitor.

9. A method as set forth in claim 1 wherein said particles have a silicon carbide shell with a carbon overcoat, said method further comprising the initial step of removing said carbon overcoat by burning.

* * * * *